(12) United States Patent
Lee et al.

(10) Patent No.: US 11,700,660 B2
(45) Date of Patent: Jul. 11, 2023

(54) METHOD AND DEVICE FOR PROVIDING VEHICLE COMMUNICATION SERVICE

(71) Applicant: Samsung Electronics Co., Ltd., Suwon-si (KR)

(72) Inventors: Hoyeon Lee, Suwon-si (KR); Sunghoon Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 17/255,962

(22) PCT Filed: Jun. 25, 2019

(86) PCT No.: PCT/KR2019/007647
§ 371 (c)(1),
(2) Date: Dec. 23, 2020

(87) PCT Pub. No.: WO2020/004899
PCT Pub. Date: Jan. 2, 2020

(65) Prior Publication Data
US 2021/0120617 A1    Apr. 22, 2021

(30) Foreign Application Priority Data
Jun. 25, 2018    (KR) .......................... 10-2018-0072920

(51) Int. Cl.
*H04W 56/00*    (2009.01)
*H04W 76/16*    (2018.01)
(Continued)

(52) U.S. Cl.
CPC ............. *H04W 76/16* (2018.02); *H04W 4/40* (2018.02); *H04W 72/02* (2013.01);
(Continued)

(58) Field of Classification Search
CPC ....... H04W 76/16; H04W 4/40; H04W 76/27; H04W 72/02; H04W 72/0446; H04W 72/0453
(Continued)

(56) References Cited

U.S. PATENT DOCUMENTS

2018/0368191 A1* 12/2018 Vutukuri ............... H04W 56/00
2019/0090218 A1   3/2019 Noh et al.
(Continued)

FOREIGN PATENT DOCUMENTS

KR    10-2017-0112945 A    10/2017
KR    10-2019-0116888 A    10/2019
(Continued)

OTHER PUBLICATIONS

International Search Report dated Oct. 2, 2019 in connection with International Patent Application No. PCT/KR2019/007647, 2 pages.
(Continued)

*Primary Examiner* — Sai Ming Chan

(57) ABSTRACT

The present disclosure relates to: a communication method for fusing IoT technology with 5G communication systems for supporting higher data transmission rates than preceding 4G systems; and to a system for same. The present disclosure may be applied to intelligent services (for example, smart homes, smart buildings, smart cities, smart cars or connected cars, healthcare, digital education, retail business, security and safety-related services, etc.) based on 5G communication technology and IoT-related technology. The present invention discloses a method for providing a vehicle communication service (vehicle-to-everything, V2X) in a 5G mobile communication system.

8 Claims, 12 Drawing Sheets

(51) Int. Cl.
    *H04W 4/40*      (2018.01)
    *H04W 76/27*     (2018.01)
    *H04W 72/02*     (2009.01)
    *H04W 72/0446*   (2023.01)
    *H04W 72/0453*   (2023.01)
(52) U.S. Cl.
    CPC ... *H04W 72/0446* (2013.01); *H04W 72/0453* (2013.01); *H04W 76/27* (2018.02)
(58) Field of Classification Search
    USPC .......................................................... 370/329
    See application file for complete search history.

(56) References Cited

U.S. PATENT DOCUMENTS

| | | | |
|---|---|---|---|
| 2019/0150135 A1 | 5/2019 | Lee et al. | |
| 2019/0173612 A1* | 6/2019 | Kimura | H04L 5/0044 |
| 2019/0274121 A1* | 9/2019 | Wu | H04W 72/042 |
| 2019/0313221 A1 | 10/2019 | Lee et al. | |
| 2020/0053525 A1 | 2/2020 | Byun et al. | |

FOREIGN PATENT DOCUMENTS

| | | |
|---|---|---|
| WO | 2017/192006 A2 | 11/2017 |
| WO | 2018/044358 A1 | 3/2018 |
| WO | WO-2018044358 A1 * | 3/2018 |
| WO | 2018/059506 A1 | 4/2018 |
| WO | 2018/066905 A1 | 4/2018 |

OTHER PUBLICATIONS

Written Opinion of the International Searching Authority dated Oct. 2, 2019 in connection with International Patent Application No. PCT/KR2019/007647, 5 pages.
HTC, "Network controlled mobility to 5GC or EPC", 3GPP TSG-RAN WG2#101bis, Apr. 16-20, 2018, R2-1805950, 17 pages.
AT&T et al., "X2/Xn Interface Development for LTE-NR Tight Integration", 3GPP TSG-RAN WG3 #96, May 15-19, 2017, R3-171564, 5 pages.
Ericsson et al., "LTE-NR resource allocation coordination over X2", 3GPP TSG RAN WG3 Meeting #99, Feb. 26-Mar. 1, 2018, R3-181284, 6 pages.
LG Electronics Inc., "pCR to 38.913 on eV2X requirements", 3GPP TSG-RAN#73, Sep. 19-22, 2016, RP-161652, 2 pages.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.2.1 (Jun. 2018), 791 pages.
Supplementary European Search Report dated Jul. 12, 2021 in connection with European Patent Application No. 19 82 7388, 11 pages.

* cited by examiner

METHOD AND DEVICE FOR PROVIDING VEHICLE COMMUNICATION SERVICE

CROSS-REFERENCE TO RELATED APPLICATIONS

This application is a 371 of International Application No. PCT/KR2019/007647 filed on Jun. 25, 2019, which claims priority to Korean Patent Application No. 10-2018-0072920 filed on Jun. 25, 2018, the disclosures of which are herein incorporated by reference in their entirety.

BACKGROUND

1. Field

The disclosure relates to a method for providing a vehicle communication service (vehicle-to-everything, V2X) in a 5G mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System".

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

For the 5G system, studies are being conducted to support a wider variety of services than the existing 4G system. For example, the most representative services of the 5G system include an enhanced mobile broadband (eMBB) service, an ultra-reliable and low latency communication (URLLC) service, a massive machine type communication (mMTC) service, an evolved multimedia broadcast/multicast service (eMBMS), and the like. Further, a system for providing the URLLC service may be referred to as a URLLC system, and a system for providing the eMBB service may be referred to as an eMBB system. In addition, the terms "service" and "system" may be used interchangeably.

Among these services, the URLLC service is a service that is newly considered in the 5G system, in contrast to the existing 4G system The URLLC service requires to satisfy ultrahigh reliability (e.g., packet error rate of about 10-5) and low latency (e.g., about 0.5 msec) conditions compared to the other services. In order to satisfy such strict requirements, the URLLC service may need to apply a transmission time interval (TTI) that is shorter than that of the eMBB service, and various operating methods using this are under consideration.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Vehicle-to-everything (V2X) is a general term denoting every type of communication scheme applicable to vehicles on roads and, in line with development of wireless communication technologies, has enabled various additional services in addition to initial safety use cases.

Wireless access in vehicular environments (WAVE) specifications based on IEEE 802.11p and IEEE P1609 have been standardized as V2X service providing technologies. However, the WAVE, which is a kind of dedicated short-range communication (DSRC) technology, has a limitation in that messages can be exchanged within a limited distance between vehicles.

In order to overcome such a limitation, cellular-based V2X technology standardization is being conducted under 3GPP. LTE-based evolved packet system (EPS) V2X standards have been completed in Release 14/Release 15, and NR-based $5^{th}$ generation system (5GS) V2X standards are being established in Release 16.

The disclosure proposes a method for communication between a vehicle supporting an EPS V2x function and a vehicle supporting a 5GS V2X function in a 3GPP-based V2X system. In addition, the disclosure proposes a method wherein a vehicle that accesses 5GS and uses a V2X function receives radio resource information from a base station in order to communicate with a vehicle supporting the EPS V2X function.

Technical objectives to be accomplished by the disclosure are not limited to the above-mentioned technical objectives, and other technical objectives not mentioned herein could be clearly understood by those skilled in the art to which the disclosure pertains from the following description.

SUMMARY

A method of a terminal in a wireless communication system, according to an embodiment of the disclosure for solving the above-mentioned problems, may include the operations of: configuring a radio resource control (RRC) connection with a first base station using a first radio access technology; receiving, from the first base station, sidelink resource information based on a second radio access technology; and, performing a vehicle-to-everything (V2X) communication using the second radio access technology, based on the sidelink resource information.

In addition, a terminal in a wireless communication system according to an embodiment of the disclosure may include: a transceiver; and a controller configured to configure a radio resource control (RRC) connection with a first base station using a first radio access technology; control the transceiver to receive, from the first base station, sidelink resource information based on a second radio access technology; and, perform a vehicle-to-everything (V2X) communication using the second radio access technology, based on the sidelink resource information.

The disclosure is advantageous in that a vehicle terminal can use a vehicle communication service provided by a V2X system. In this regard, the vehicle terminal may refer to a device embedded in the vehicle, or a terminal attached to the vehicle, such as a smartphone or a black box.

A terminal according to an embodiment of the disclosure may access a 5GS and use a 5GS V2X service by using an NR radio technology. A base station using the NR radio technology may provide the terminal with radio resource information such that the same can use a V2X service by using an LTE radio technology. This is advantageous in that the terminal according to an embodiment of the disclosure may transmit a V2X message through the LTE radio technology even while staying in an NR base station, and terminals that use the V2X service by accessing the LTE (instead of NR) may receive the message.

In addition, a terminal according to an embodiment of the disclosure may access an EPS and use an EPS V2X service by using the LTE radio technology. A base station using the LTE radio technology may provide the terminal with radio resource information such that the same can use the V2X service by using the NR radio technology. This is advantageous in that the terminal according to an embodiment of the disclosure may transmit a V2X message through the NR radio technology even while staying in an LTE base station, and terminals that use the V2X service by accessing the NR (instead of LTE) may receive the message.

In addition, a terminal according to an embodiment of the disclosure may acquire resource information regarding one or more radio technologies from an accessed base station, and may prevent radio resource collision by using the acquired radio technology resource information, thereby improving the ratio of successful message transmission and reception.

Advantageous effects obtainable from the disclosure are not limited to the above-mentioned advantageous effects, and other advantageous effects not mentioned herein could be clearly understood by those skilled in the art to which the disclosure pertains from the following description.

DETAILED DESCRIPTION

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

In the following description, although embodiments of the disclosure will be explained in detail based on a communication standard defined by the 3rd generation partnership project (3GPP), it will be understood by a person skilled in the art that the subject matter of the disclosure can be applied even to other communication systems having the similar technical background, with a slight modification, without departing from the scope of the disclosure.

Further, in the following description, although embodiments of the disclosure will be explained in detail based on a V2X system and a V2X service (e.g., transmission and reception of a V2X message or V2X data, etc.), it will be understood by a person skilled in the art that the subject matter of the disclosure can be applied even to other communication systems and communication services (e.g., transmission and reception of a message or data, etc.) having the similar technical background, with a slight modification, without departing from the scope of the disclosure.

Figure 1:
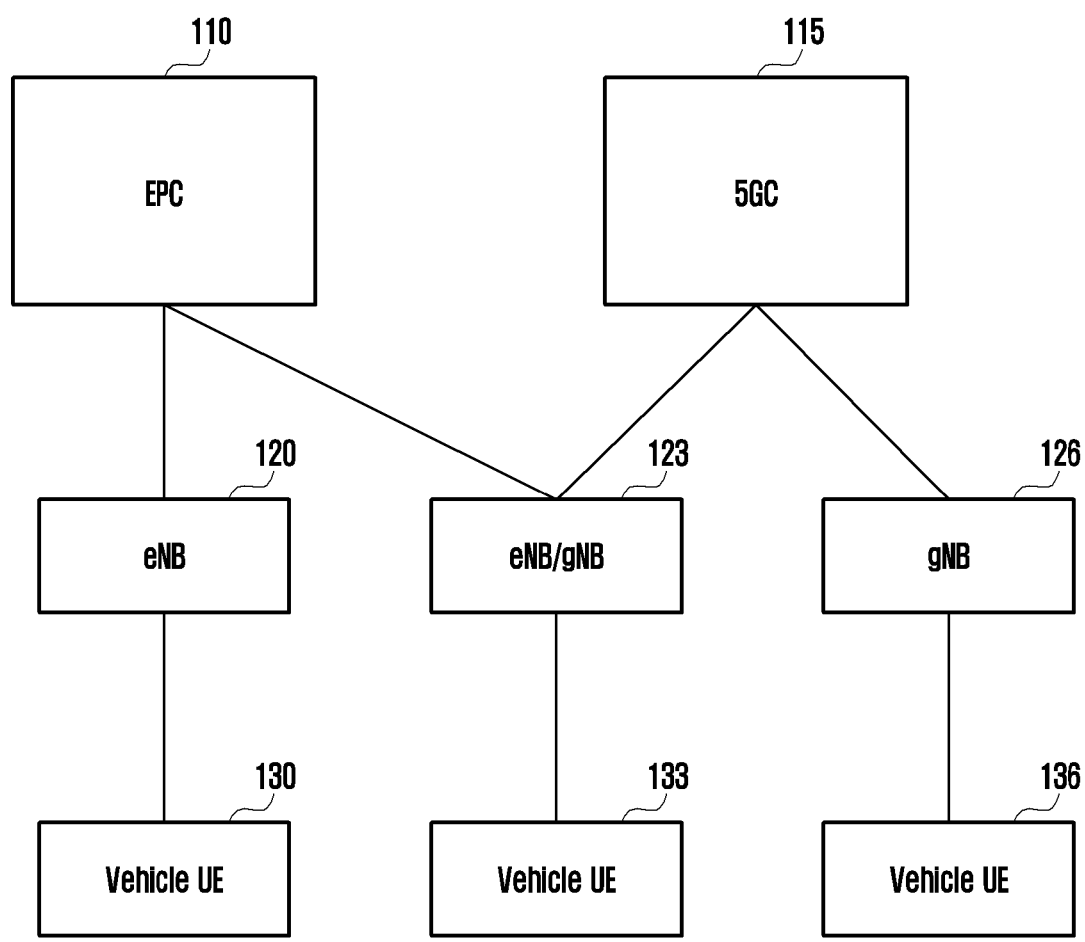
FIG. 1 is a block diagram illustrating an example of a V2X system architecture, and indicating a connection between a network entity and a vehicle user equipment (UE) according to an embodiment of the disclosure.

FIG. 1 is a block diagram illustrating an example of a V2X system architecture, and indicating a connection between a network entity and a vehicle UE according to an embodiment of the disclosure. An evolved packet system (EPS)-based V2X system may include an evolved packet core (EPC) core network 110 and long term evolution (LTE) base stations 120 and 123. A 5th generation system (5GS)-based V2X system may include a 5th generation core (5GC) core network 115 and new radio (NR) base stations 123 and 126.

The base station 123 connected to both the EPC core network and the 5GC core network may provide both an LTE base station function and an NR base station function. The base station 123 may be referred to as a 5G base station or a gNB. In the disclosure, an EPS V2X function refers to a function which allows a UE to access an EPS, a 4G core network, and use a V2X service. Since a 4G UE uses LTE as a radio access technology, a UE supporting the EPS V2X function may access the EPS to use an LTE V2X function. LTE V2X may refer to a V2X technology provided by LTE as a UE-to-UE communication technology, and may be called LTE PC5. In the disclosure, a 5GS V2X function refers to a function which allows a UE to access a 5GS, a 5G core network, and use a V2X service. Since a 5G UE may use LTE (or evolved LTE) and new radio (NR) as a radio access technology, a UE supporting the 5GS V2X function may access the 5GS to use LTE V2X and NR V2X functions. NR V2X may refer to a V2X technology provided by NR as a UE-to-UE communication technology, and may be called an NR PC5 interface.

A vehicle UE according to an embodiment of the disclosure may provide the EPS V2X function or the 5GS V2X function, or provide both the EPS V2X function and the 5GS V2X function. The vehicle UE providing the EPS V2X function may provide an LTE-based direct communication interface (e.g., an LTE PC5 interface, a D2D interface, etc.). The vehicle UE providing the 5GS V2X function may provide a 5G-based direct communication interface (e.g., an NR PC5 interface, a D2D interface, etc.).

Referring to FIG. 1, a vehicle UE 130 may be connected to the EPC core network 110 through the LTE base station 120 by using a possessed EPS V2X function. Alternatively, a vehicle UE 136 may be connected to the 5GC core network 115 through the NR base station 126 by using a possessed 5GS V2X function. Alternatively, a vehicle UE 133 may be connected to the EPC core network 110 through the LTE base station 123 by using a possessed EPS V2X function. Alternatively, the vehicle UE 133 may be connected to the 5GC core network 115 through the NR base station 123 by using a possessed 5GS V2X function.

Figure 2:
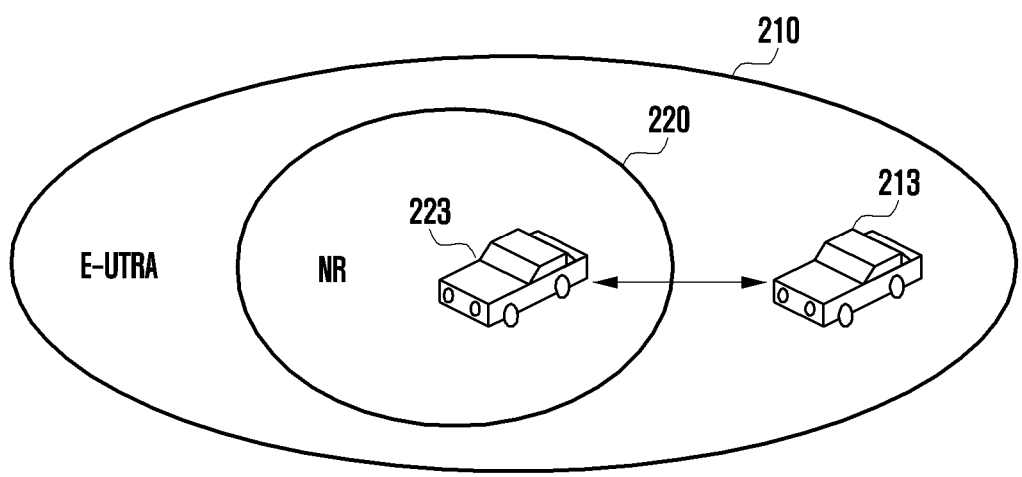
FIG. 2 illustrates a communication scenario between a vehicle located in an E-UTRA area and a vehicle located in an NR area in a case where the E-UTRA area includes the NR area according to an embodiment of the disclosure.

FIG. 2 illustrates a communication scenario between a vehicle located in an E-UTRA area and a vehicle located in an NR area according to an embodiment of the disclosure.

Referring to FIG. 2, an E-UTRA area 210 may include an NR area 220. A vehicle 213 located in the E-UTRA area 210 and a vehicle 223 located in the NR area 220 may exchange a V2X message with each other through a UE-to-UE direct communication service (e.g., proximity-based service (ProSe), device-to-device (D2D), sidelink communication, etc.).

When both the vehicles support LTE PC5, the vehicle-to-vehicle direct communication may use an LTE-based direct communication interface (e.g., an LTE PC5 interface). Alternatively, when both the vehicles support NR PC5, the vehicle-to-vehicle direct communication may use a 5G-based direct communication interface (e.g., an NR PC5 interface).

Figure 3:
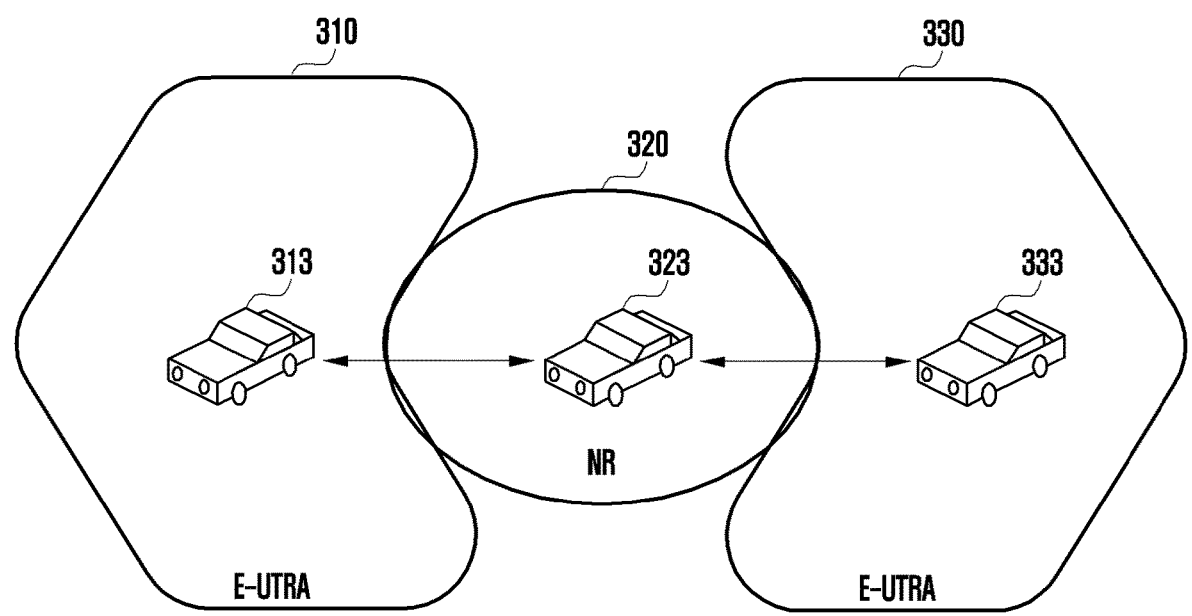
FIG. 3 illustrates a communication scenario between a vehicle located in an E-UTRA area and a vehicle located in an NR area in a case where the E-UTRA area does not include the NR area according to an embodiment of the disclosure.

FIG. 3 illustrates a communication scenario between a vehicle located in an E-UTRA area and a vehicle located in an NR area according to an embodiment of the disclosure.

Referring to FIG. 3, an E-UTRA area 310 may not include an NR area 320. A vehicle 313 located in the E-UTRA area 310 and a vehicle 323 located in the NR area 320 may exchange a V2X message with each other through a UE-to-UE direct communication service (e.g., ProSe, D2D communication, etc.).

When both the vehicles support LTE PC5, the vehicle-to-vehicle direct communication may use an LTE-based direct communication interface (e.g., an LTE PC5 interface). Alternatively, when both the vehicles support NR PC5, the vehicle-to-vehicle direct communication may use a 5G-based direct communication interface (e.g., an NR PC5 interface).

In addition, referring to FIG. 3, the NR area 320 may be adjacent to a plurality of different E-UTRA areas 310 and 330. The vehicle 323 located in the NR area 320 may exchange a V2X message with the vehicle 313 located in the E-UTRA area 310 and a vehicle 333 located in another E-UTRA area 330 through a UE-to-UE direct communication service (e.g., ProSe, D2D, sidelink communication, etc.).

According to an embodiment of the disclosure, the vehicle 323 located in the NR area may use the same direct communication service when directly communicating with a plurality of vehicle UEs 313 and 333 located in the E-UTRA areas. For example, the vehicle 323 may exchange a V2X message with the vehicle 313 and the vehicle 333 by using the LTE PC5 interface. Alternatively, the vehicle 323 may exchange a V2X message with the vehicle 313 and the vehicle 333 by using the NR PC5 interface.

In addition, according to an embodiment of the disclosure, the vehicle 323 located in the NR area may use different direct communication services when directly communicating with the plurality of vehicle UEs 313 and 333 located in the E-UTRA areas. For example, the vehicle 323 may exchange a V2X message with the vehicle 313 by using the LTE PC5 interface, and exchange a V2X message with the vehicle 333 by using the NR PC5 interface.

PC5 communication of a vehicle UE according to an embodiment of the disclosure may be performed by three methods. In the first method, a UE transmits, to a base station, a request message inquiring about what resource is to be used for transmission of a message in order to transmit the message through a PC5 interface, and the base station selects an optimal sidelink transmission resource, based on the current network situation, and notifies the UE of the selected sidelink transmission resource through a reply. Whenever the UE transmits a V2X message, the UE may request sidelink resource information from the base station. In the following description of the disclosure, the first method is referred to as mode 3 (or referred to as mode 1) operation.

In the second method, a UE transmits, to a base station, a message requesting resource information for message transmission in order to transmit a message through a PC5 interface, and the base station transmits sidelink resource pool information available by the UE to the UE through a reply. The UE may store the sidelink resource pool information received from the base station, and transmit a V2X message by selecting a resource from the stored sidelink resource pool whenever transmitting the V2X message. Alternatively, even when the UE does not explicitly request resource information from the base station, the base station may inform the UE of the sidelink resource pool information through system information provided to the UE, and the UE uses the received information to select a resource at the time of transmitting a V2X message. In the following description of the disclosure, the second method is referred to as an in-coverage operation of mode 4 (or referred to as mode 2).

In the third method, sidelink resource information for V2X message transmission is pre-configured for a UE, and the UE transmits a V2X message by using the pre-configured sidelink resource information. In the third method, communication between a UE and a base station may not be required. In the following description of the disclosure, the third method is referred to as an out-of-coverage operation of mode 4 (or referred to as mode 2). The above three methods may be applied to LTE PC5 communication and NR PC5 communication.

Figure 4:
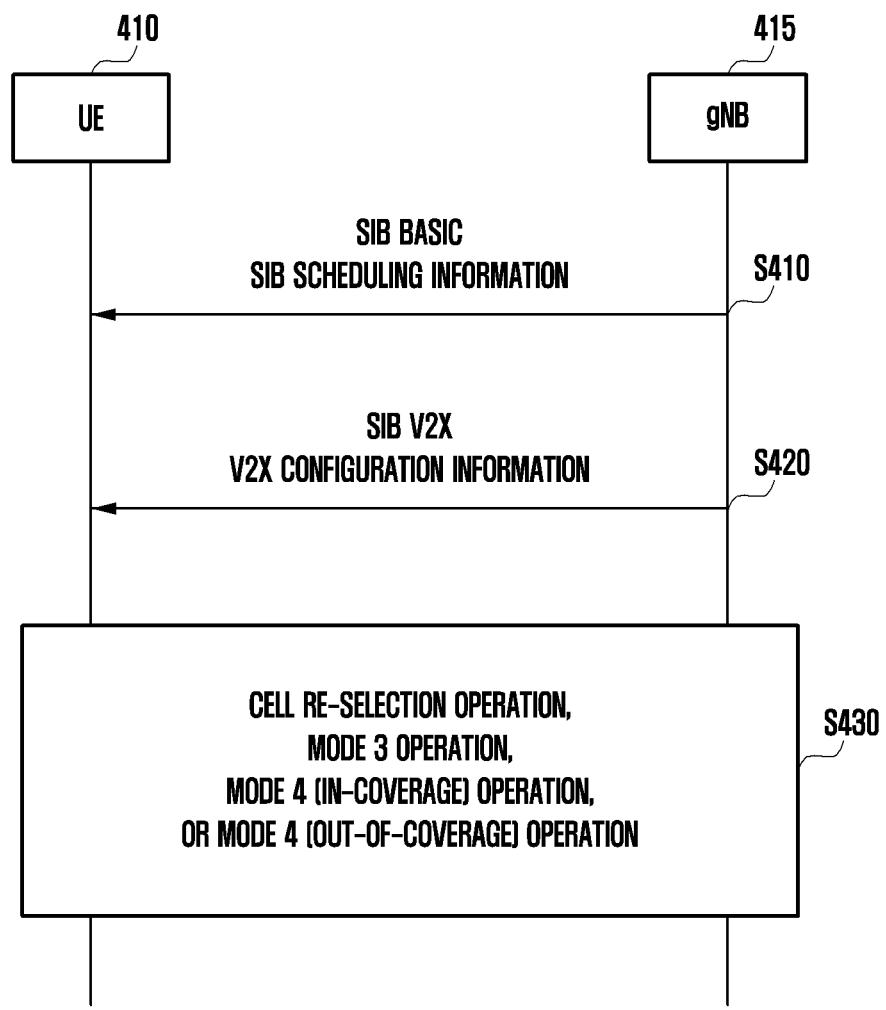
FIG. 4 illustrates a message transmission procedure between a vehicle UE and a base station which provides a V2X function according to an embodiment of the disclosure.

FIG. 4 illustrates a message transmission procedure between a vehicle UE and a base station which provides a V2X function according to an embodiment of the disclosure.

Referring to FIG. 4, a UE 410 may receive a system information block (SIB) basic message from an NR base station 415 (S410). The SIB basic message (S410) may include radio resource scheduling information which allows reception of an SIB v2x message (S420). The radio resource scheduling information may indicate a resource in a time-frequency domain in which the SIB v2x message is actually transmitted, and may be basic radio resource configuration information required for reception of system information.

The UE having received the SIB basic message may receive the SIB v2x message according to the scheduling information included in the SIB basic message (S420). The SIB v2x message may include information (e.g., radio resource information and a V2X function provided by the NR base station 415) required for providing a V2X service. The V2X function provided by the NR base station 415 may include a UE-autonomous sidelink transmission/reception function, a neighbor frequency resource scheduling function, an interference management function, and the like. In addition, the radio resource information provided by the NR base station 415 may include resource pool configuration information which can be used for V2X sidelink transmission and reception, specifically, a transmission resource pool, a reception resource pool, and a resource pool which can be used in an exceptional situation. The UE having received the SIB v2x message may perform a subsequent operation according to the information included in the SIB v2x message (S430).

The SIB v2x message is not limited to a dedicated message which may include only information required for providing a v2x service. That is, the SIB v2x message may be in the form in which information for a V2X service is included in general SIB information (e.g., SIB 20 of LTE) received by a UE. In this case, the UE may obtain scheduling information relating to another SIB message (including V2X information) obtained from the SIB basic message, receive the corresponding SIB message, and receive V2X function and resource information.

If the SIB message which may include V2X information is received but the V2X function and resource information does not exist in the corresponding message, the UE may determine that V2X is not supported in a corresponding cell and thus perform a cell re-selection operation to access another base station to receive a V2X service, or may use the V2X service by using an out-of-coverage operation of mode 4 without re-selecting a cell.

The NR base station according to an embodiment of the disclosure may control and manage an NR sidelink resource for NR PC5 communication. In addition, the NR base station according to an embodiment of the disclosure may control and manage an LTE sidelink resource for LTE PC5 communication.

Referring to FIG. 4, the SIB v2x message transmitted by the NR base station 415 to the UE 410 according to an embodiment of the disclosure may include NR sidelink resource information for NR PC5 communication and LTE sidelink resource information for LTE PC5 communication, wherein the NR sidelink resource information and the LTE sidelink resource information can be controlled and managed by the NR base station. The NR sidelink resource information may include resource pool configuration information which can be used for NR V2X sidelink transmission and reception, specifically, a transmission resource pool, a reception resource pool, and resource pool configuration information which can be used in an exceptional situation. The LTE sidelink resource information may include resource pool configuration information which can be used for LTE V2X sidelink transmission and reception, specifically, a transmission resource pool, a reception resource pool, and resource pool configuration information which can be used in an exceptional situation. The SIB v2x message may include information on whether a base station supports NR PC5 or supports mode 3 of NR PC5, mode 4 of NR PC5, or both of them. Alternatively, the SIB v2x message may include information on whether a base station supports LTE PC5 or supports mode 3 of LTE PC5, mode 4 of LTE PC5, or both of them. For example, if there is resource pool information for mode 4 of LTE PC5 in the message, the UE may be aware that the base station supports LTE PC5 mode 4. Alternately, for example, the message may include an indicator which indicates an RAT type (e.g., LTE or NR) supported by the base station.

Figure 7:
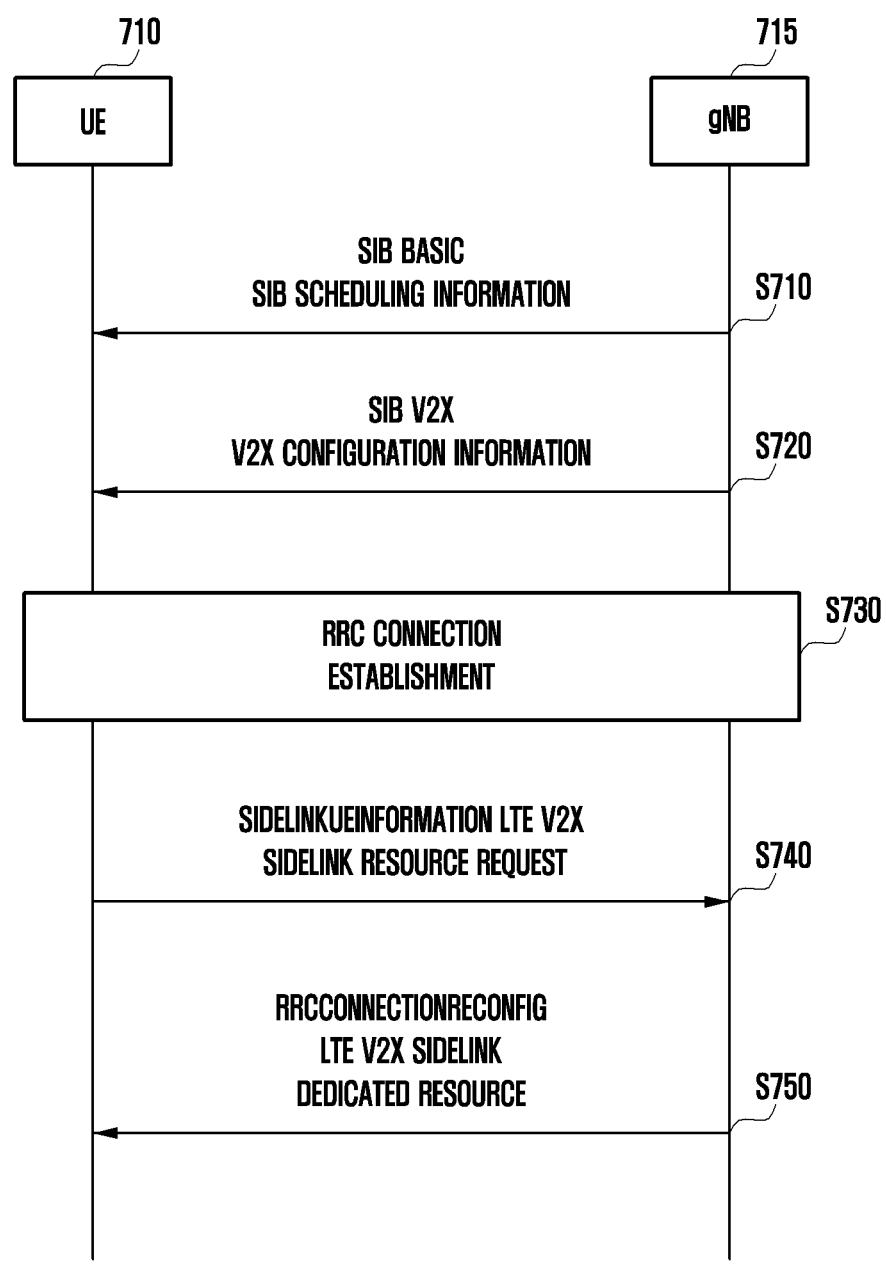
FIG. 7 illustrates a procedure for mode 3 operation when communication between a base station using an LTE radio technology and a base station using an NR radio technology is not required according to an embodiment of the disclosure.
Figure 8:
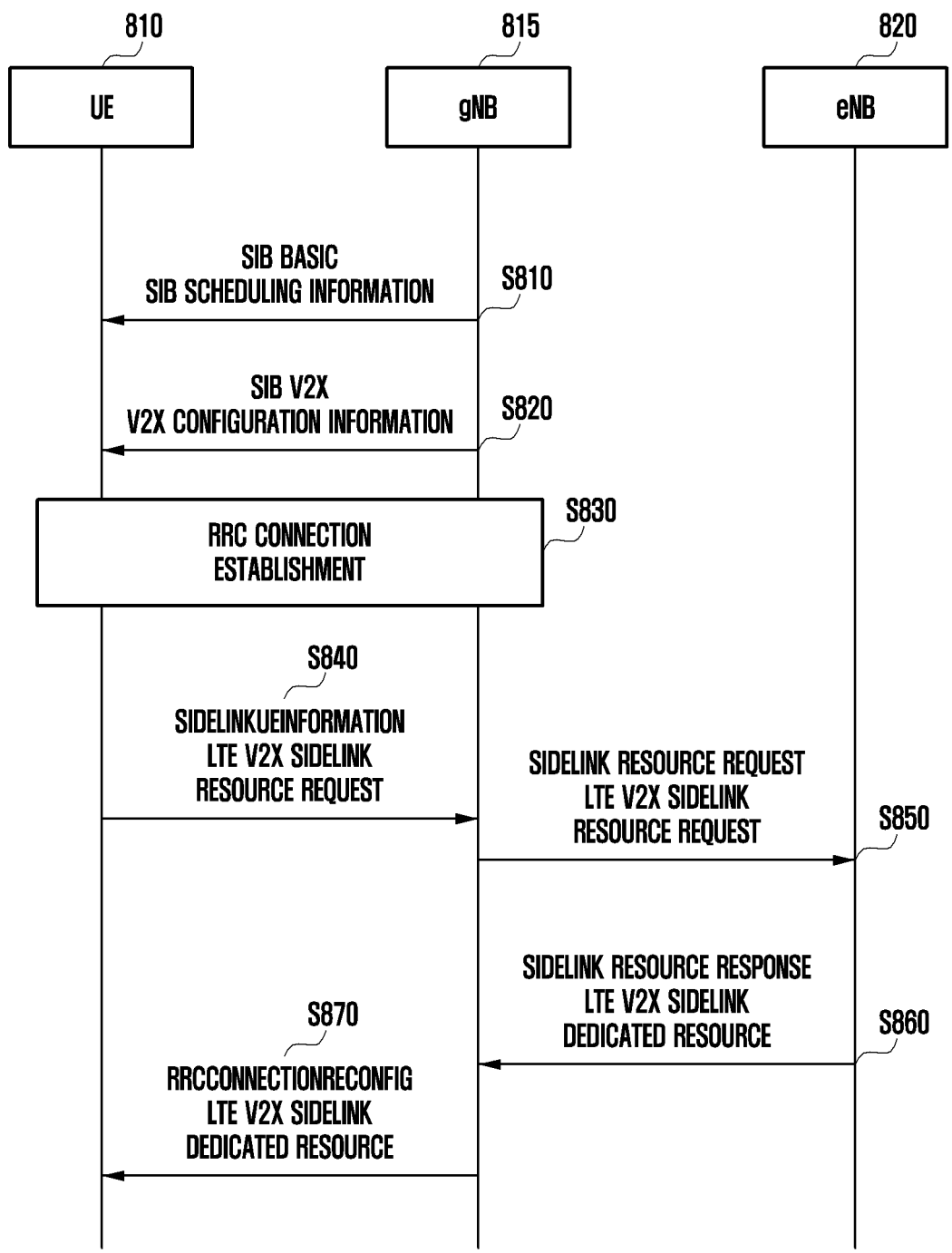
FIG. 8 illustrates a procedure for mode 3 operation when communication between a base station using an LTE radio technology and a base station using an NR radio technology is required according to an embodiment of the disclosure.

If the SIB v2x message received by the UE includes information on LTE PC5 mode 3 or information for supporting LTE PC5, the UE having received the SIB v2x message may perform mode 3 operation for LTE PC5 communication. The mode 3 operation is illustrated in FIGS. 7 and 8.

Figure 9:
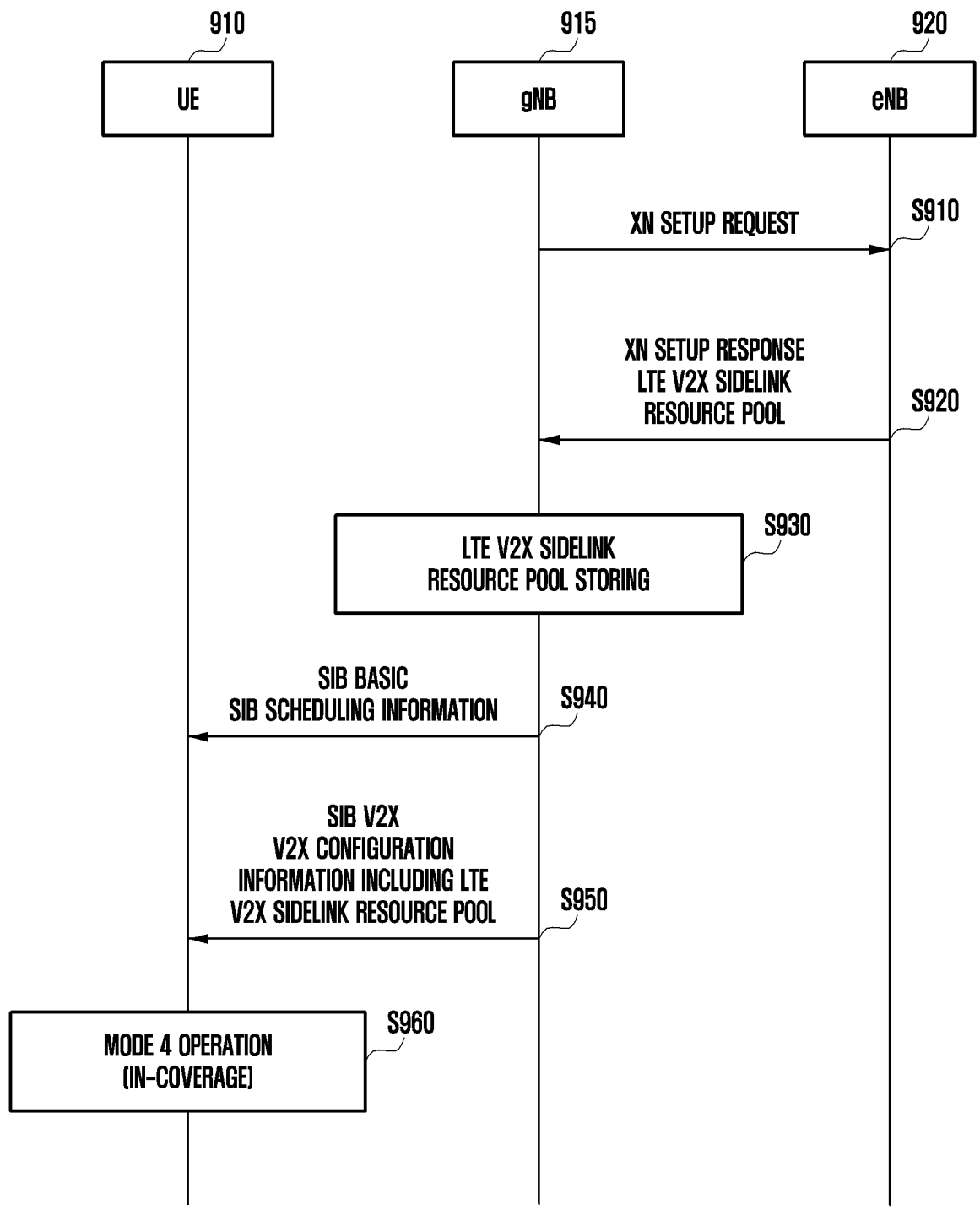
FIG. 9 illustrates a procedure for an in-coverage operation of mode 4 according to an embodiment of the disclosure.

If the SIB v2x message received by the UE includes resource pool information for LTE PC5 mode 4, an indicator which supports mode 4, or information indicating that LTE PC5 is supported, the UE having received the SIB v2x message may perform an in-coverage operation of mode 4 for LTE PC5 communication. The in-coverage operation of mode 4 is illustrated in FIG. 9. Since the UE has accessed the base station through the NR, it is obvious that NR PC5 can be used, and mode 3 and mode 4 operations may be determined based on the information included in the SIB v2x message.

Figure 6:
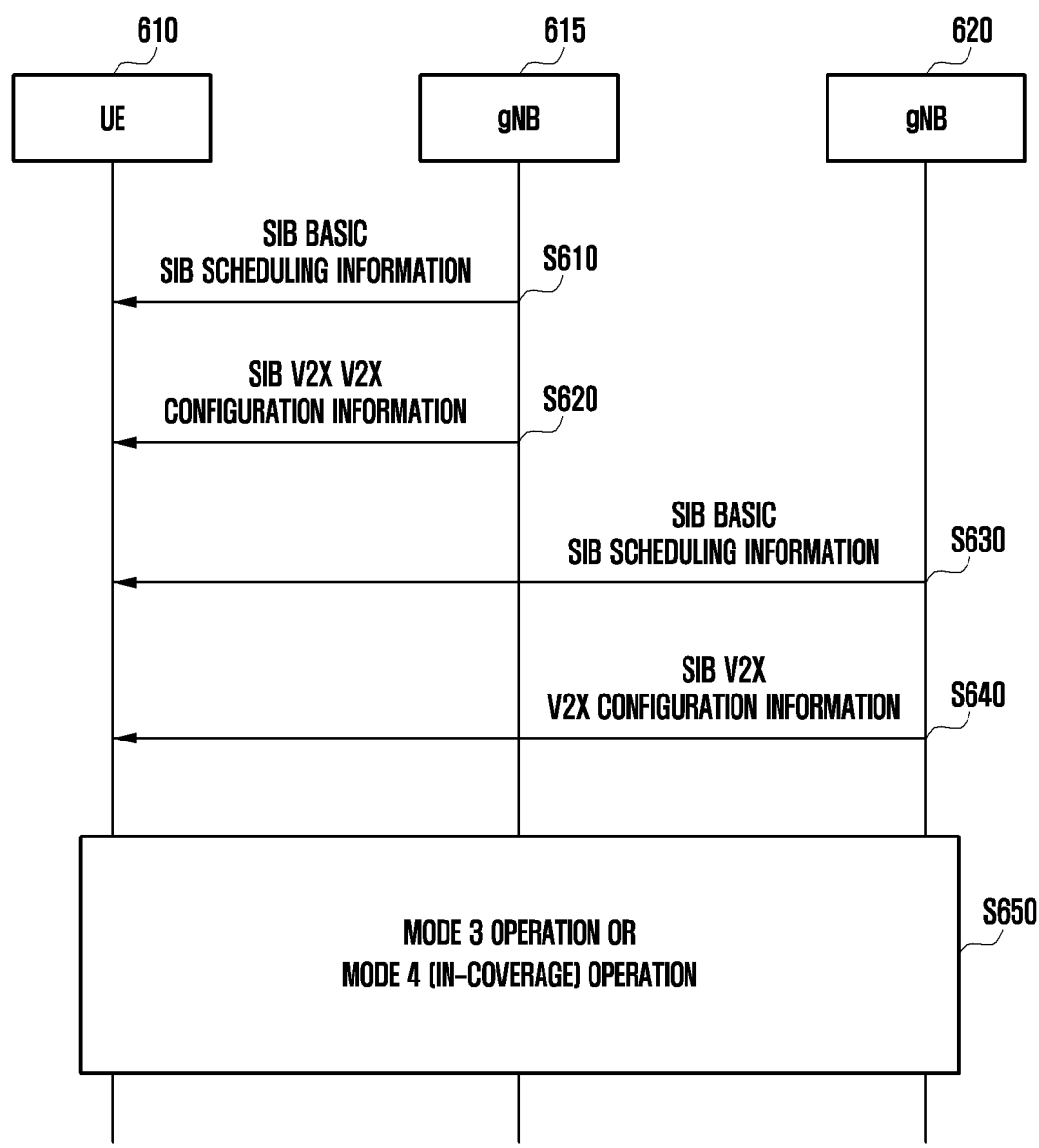
FIG. 6 illustrates a cell re-selection operation according to an embodiment of the disclosure.

Referring to FIG. 4, the SIB v2x message transmitted by the NR base station 415 to the UE 410 according to an embodiment of the disclosure may include only NR sidelink resource information for NR PC5 communication which can be controlled and managed by the NR base station, and may not include LTE sidelink resource information for LTE PC5 communication. The UE having received the SIB v2x message may perform an out-of-coverage operation of mode 4 for LTE PC5 communication. Alternatively, the UE is required to use LTE PC5 but, as a result of receiving the SIB v2x message, if the corresponding base station does not support the LTE PC5, the UE having received the SIB v2x message may perform a cell re-selection operation to access another base station supporting the LTE PC5. The cell re-selection operation is illustrated in FIG. 6.

Figure 5:
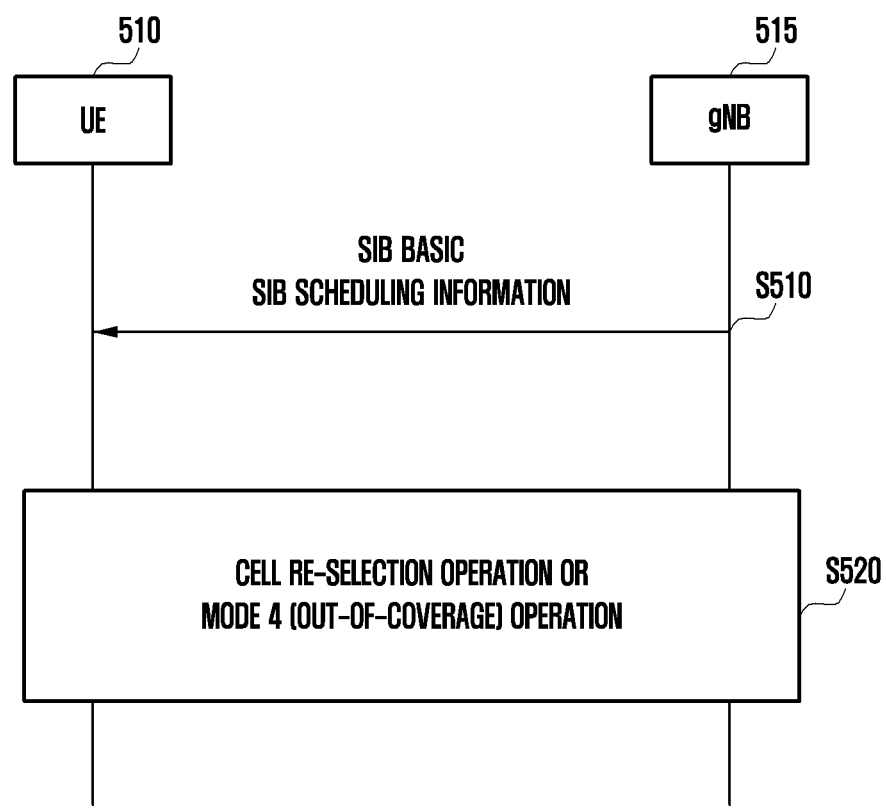
FIG. 5 illustrates a message transmission procedure between a vehicle UE and a base station which does not provide a V2X function according to an embodiment of the disclosure.

FIG. 5 illustrates a message transmission procedure between a vehicle UE and a base station which does not provide a V2X function according to an embodiment of the disclosure.

Referring to FIG. 5, a UE 510 may receive a system information block (SIB) basic message from an NR base station 515 (S510). Since the NR base station does not provide a V2X function, the SIB basic message may not include scheduling information of an SIB v2x message.

The UE having received the SIB basic message may be aware that the NR base station does not provide the V2X function, based on that the SIB basic message does not include the scheduling information of the SIB v2x message, and may perform a subsequent operation accordingly (S520). For example, the UE having received the SIB v2x message may perform an out-of-coverage operation of mode 4 for LTE PC5 communication. Alternatively, the UE having received the SIB basic message may perform a cell re-selection operation to access another base station. The cell re-selection operation is illustrated in FIG. 6.

FIG. 6 illustrates a cell re-selection operation according to an embodiment of the disclosure.

According to an embodiment of the disclosure, a vehicle UE 610 having received an SIB basic message from an NR base station 615 (S610) may select a cell of another base station to attempt access. The procedure is shown in FIG. 5. That is, if the SIB basic message does not include scheduling information which allows reception of an SIB v2x message (S620), the UE may perform an operation for finding another cell without accessing a network through a corresponding cell.

Alternatively, according to an embodiment of the disclosure, the vehicle UE 610 having received the SIB basic message and the SIB v2x message from the NR base station 615 may determine to select a cell of another base station, based on information included in the SIB v2X message. The procedure is shown in FIG. 4. For example, the UE is required to use LTE PC5 but, as a result of receiving the SIB v2x message, if the corresponding base station does not support the LTE PC5, the UE having received the SIB v2x message may perform a cell re-selection operation to access another base station supporting the LTE PC5.

After receiving the SIB basic message or the SIB v2x message, the UE 610 may receive a system information block (SIB) basic message transmitted by another NR base station 620 in order to find another cell which provides a desired V2X service (S63). The SIB basic message may include radio resource scheduling information which allows reception of an SIB v2x message. The UE having received the SIB basic message may receive the SIB v2x message according to the scheduling information included in the SIB basic message (S640).

The SIB v2x message may include information (e.g., resource information and a V2X function provided by the NR base station 620) required for providing a V2X service. The SIB v2x message may include NR sidelink resource information for NR PC5 communication and LTE sidelink resource information for LTE PC5 communication, wherein the NR sidelink resource information and the LTE sidelink resource information can be controlled and managed by the NR base station. The UE having received the SIB v2x message may perform mode 3 operation for LTE PC5 communication (S650). The mode 3 operation is illustrated in FIGS. 7 and 8.

Alternately, the UE having received the SIB v2x message may perform an in-coverage operation of mode 4 for LTE PC5 communication (S650). The in-coverage operation of mode 4 is illustrated in FIG. 9. For another example, after receiving the SIB basic message or the SIB v2x message, the UE 610 may select an LTE base station other than the NR base station in order to find another cell which provides a desired V2X service. The UE may receive a system information block (SIB) basic message transmitted by the LTE base station, select a corresponding cell, and receive SIB21 (that is, an SIB message including V2X radio resource information) of the corresponding cell, so as to start LTE PC5 communication.

According to an embodiment of the disclosure, there may be two methods for controlling and managing, by an NR base station, LTE sidelink resource information for LTE PC5 communication.

In the first method, all LTE sidelink resources are controlled and managed by an LTE base station. In the case of the first method, when an NR base station requests LTE sidelink resource information from an LTE base station, the LTE base station may inform the NR base station of the LTE sidelink resource information managed by the LTE base station.

In the second method, resources available for LTE sidelink are distributed to an LTE base station and an NR base station, and are independently controlled and managed by the LTE base station and the NR base station, respectively. In the case of the second method, since there are separate available LTE sidelink resources which can be controlled and managed by the NR base station, the NR base station may use an LTE sidelink resource in the available LTE sidelink resources managed by the NR base station, without requesting LTE sidelink resource information from the LTE base station. The LTE sidelink resource information may include resource pool configuration information which can be used for LTE V2X sidelink transmission and reception, specifically, a transmission resource pool, a reception resource pool, and resource pool configuration information which can be used in an exceptional situation. Each of the LTE base station and the NR base station may control and manage sidelink resource pool configuration for the opposing RAT-type.

FIG. 7 illustrates a procedure for mode 3 operation according to an embodiment of the disclosure.

According to an embodiment of the disclosure, a vehicle UE 710 having received an SIB basic message and an SIB v2x message (S710 and S720) may be aware that an NR base station 715 can control and manage an LTE sidelink resource for LTE PC5 communication, based on information included in the SIB v2x message. The UE may configure an RRC connection with the NR base station for mode 3 operation (S730). The UE having completed the RRC connection configuration may be switched into an RRC connected mode state.

The UE entered into the RRC connected mode state may request an LTE PC5 transmission resource for transmitting a V2X message from the NR base station through an LTE PC5 interface (S740). The resource request message transmitted by the UE 710 to the base station 715 in S740 may include at least one of QoS information (e.g., PPPP, PPPR, 5QI and/or 5G QoS parameters) desired to be used by the UE, and V2X service information (e.g., PSID, ITS-AID, etc.) desired to be used by the UE. When the LTE sidelink resources are divided into resources which can be independently used by an LTE base station and an NR base station, and are then controlled and managed by the LTE base station and the NR base station, respectively, the NR base station may select an LTE sidelink resource which can be currently provided in mode 3 from among the LTE sidelink resources which can be controlled and managed by itself, and provide the selected LTE sidelink resource to the UE (S750). The resource information transmitted by the base station 715 to the UE 710 in S750 may include sidelink transmission resource information directly scheduled by the base station. The resource configuration information may be used to re-configure one resource pool among a plurality of resource pools provided by system information, and particularly, indicates resource information in a specific time-frequency domain which is required to be transmitted by the UE within the configured resource pool. This means that the base station controls all sidelink transmissions of a UE existing within a serving cell, and interference between sidelink transmissions between UEs may be physically controlled. This corresponds to mode 3 transmission in LTE V2X, and is mapped to NR mode 3 operation in the disclosure.

FIG. 8 illustrates a procedure for mode 3 operation according to an embodiment of the disclosure.

According to an embodiment of the disclosure, a vehicle UE 810 having received an SIB basic message and an SIB v2x message (S810 and S820) may be aware that an NR base station 815 can control and manage an LTE sidelink resource for LTE PC5 communication, based on information included in the SIB v2x message. The UE may configure an RRC connection with the NR base station for mode 3 operation (S830). The UE having completed the RRC connection configuration may be switched into an RRC connected mode state.

The UE entered into the RRC connected mode state may request an LTE PC5 transmission resource for transmitting a V2X message from the NR base station through an LTE PC5 interface (S840). The resource request message transmitted by the UE 810 to the base station 815 in S840 may be configured similarly as S740 of FIG. 7. When there is no available LTE sidelink resource independently controlled and managed by the NR base station, the NR base station may request LTE sidelink resource information from an LTE base station 820 to allocate the LTE PC5 transmission resource requested by the UE (S850). The resource request message transmitted by the NR base station 815 to the LTE base station 820 in S850 may include an indicator for requesting V2X resource configuration information which has been configured in the corresponding LTE base station. The LTE base station 820 having received the request message may select an LTE sidelink resource which can be provided to the UE from among available LTE sidelink resources (for example, an operation of transmitting specific resource pool and scheduled resource information for the UE, which has been transmitted via a dedicated RRC message, is performed), and provide the selected LTE sidelink resource to the NR base station 815 (S860). The resource request response message transmitted by the LTE base station 820 to the NR base station 815 in S860 may include a complete message including an indicator indicating that the above message has been well received, as a response. The NR base station may provide, to the vehicle UE 810, the LTE sidelink resource information received from the LTE base station (S870). The resource information transmitted by the UE 810 to the base station 815 in S870 may be configured similarly as S750 of FIG. 7.

FIG. 9 illustrates a procedure for an in-coverage operation of mode 4 according to an embodiment of the disclosure.

Referring to FIG. 9, when there is no separate LTE sidelink resource pool which can be directly controlled and managed by an NR base station, an NR base station 915 may request an LTE base station 920 to provide LTE sidelink resource pool information which the NR base station can use. The LTE sidelink resource pool information request may be included in an Xn connection request message for configuring an Xn connection between the NR base station and the LTE base station, and transmitted (S910). The resource request message transmitted by the NR base station 915 to the LTE base station 920 in S910 may be configured similarly as S850 of FIG. 8.

The LTE base station 920 may allocate an LTE sidelink resource pool which can be used by the NR base station, among the LTE sidelink resource pool information managed by the LTE base station, and inform the NR base station 915 of the LTE sidelink resource pool. The LTE sidelink resource pool information may be included in an Xn connection response message for configuring an Xn connection between the NR base station and the LTE base station, and transmitted (S920). The resource information transmitted by the LTE base station 920 to the NR base station 915 in S920 may be configured similarly as S860 of FIG. 8.

The NR base station having obtained the LTE sidelink resource pool information which can be managed and controlled by the NR base station from the LTE base station may store the information (S930). The NR base station may transmit an SIB basic message to a UE 910 (S940), and include the stored LTE sidelink resource pool information in an SIB v2x message and transmit the message (S950). The LTE sidelink resource pool information may include resource pool configuration information which can be used for LTE V2X sidelink transmission and reception, specifically, a transmission resource pool, a reception resource pool, and resource pool configuration information which can be used in an exceptional situation. The UE having received the SIB v2x message including the LTE sidelink resource pool information may perform an in-coverage operation of mode 4 (S960).

Alternately, according to an embodiment of the disclosure, when there is a separate LTE sidelink resource pool managed by the NR base station, the NR base station 915 may transmit the SIB v2x message including the LTE sidelink resource pool information managed by the NR base station, without requesting LTE sidelink resource pool information from the LTE base station (S950). The UE having received the SIB v2x message including the LTE sidelink resource pool information may perform the in-coverage operation of mode 4 (S960).

Figure 10:
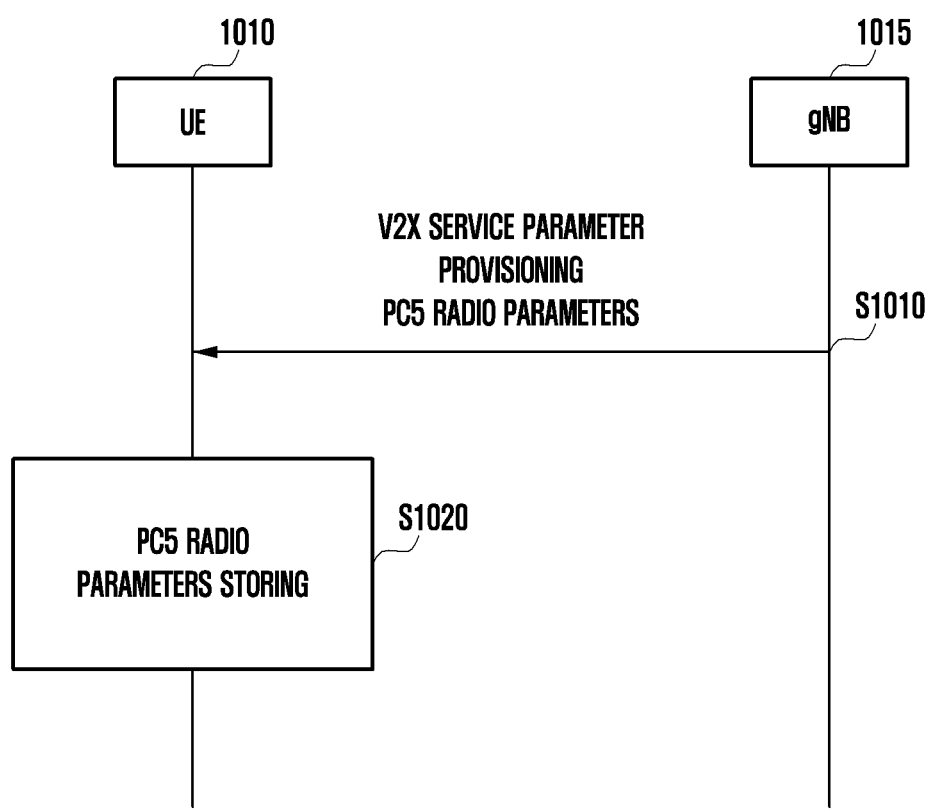
FIG. 10 illustrates a procedure for pre-configuring V2X service parameter information to a vehicle UE according to an embodiment of the disclosure.

FIG. 10 illustrates a procedure for pre-configuring V2X service parameter information to a vehicle UE according to an embodiment of the disclosure.

A vehicle UE 1010 receives V2X service parameter information from a V2X CF 1015 (e.g., a V2X control function, a V2X application server (AS), a policy control function (PCF), etc.) (S1010). The V2X service parameter information may include PC5 radio parameter information for an out-of-coverage operation of mode 4. The PC5 radio parameter information received by the UE in S1010 may include resource pool configuration information which can be used for V2X sidelink transmission and reception, particularly, in exceptional situations (radio link failure, handover, and interruption time during a cell re-selection procedure).

The UE 1010 having received the V2X service parameter information may store the received information (S1020). The UE 1010 may perform an out-of-coverage operation of mode 4 by using the PC5 radio parameter information without communicating with a base station.

Figure 11:
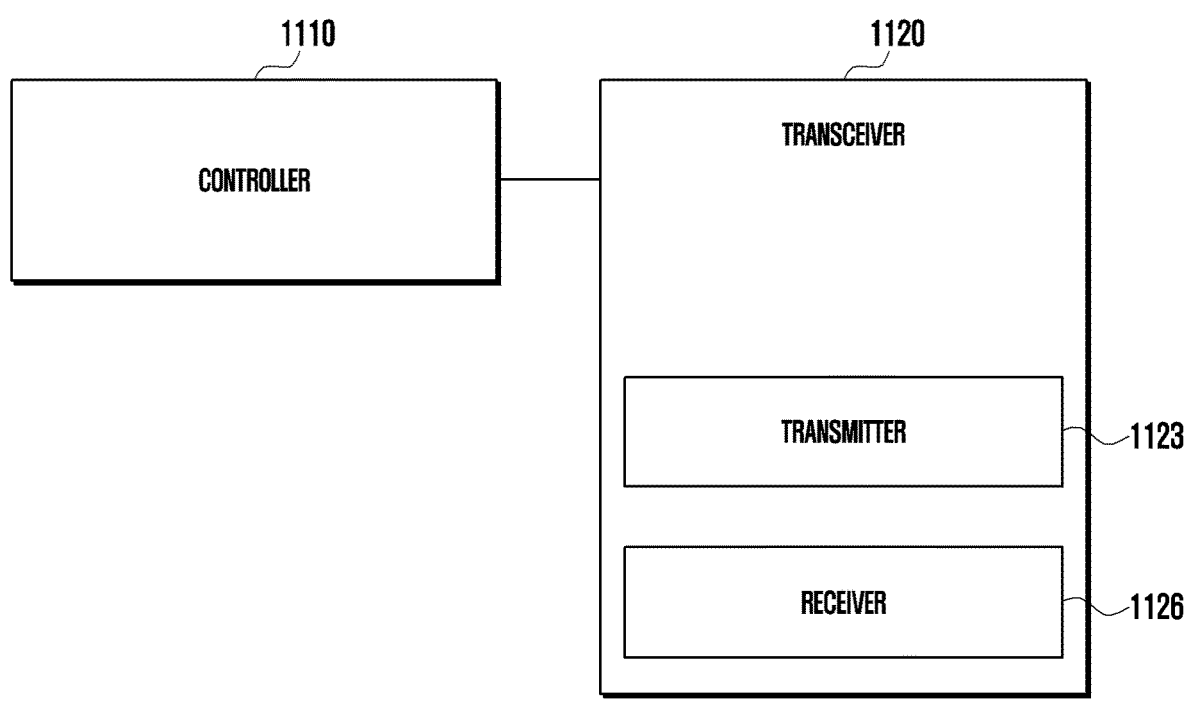
FIG. 11 illustrates a configuration of a UE according to the disclosure.

FIG. 11 illustrates a configuration of a UE according to an embodiment of the disclosure.

A UE according to an embodiment of the disclosure may include a transceiver 1120 and a controller 1110 which controls the overall operations of the UE. In addition, the transceiver 1120 may include a transmitter 1123 and a receiver 1125.

The transceiver 1120 may transmit or receive a signal with other network entities.

The controller 1110 may control the UE to perform an operation of one of the above-described embodiments. Meanwhile, the controller 1110 and the transceiver 1120 are not necessarily required to be implemented as separate modules, and the controller and the transceiver may be implemented as one component in the form of a single chip. In addition, the controller 1110 and the transceiver 1120 may be electrically connected to each other. For example, the controller 1110 may be a circuit, an application-specific circuit, or at least one processor. In addition, the operations of the UE may be implemented by including a memory device storing a corresponding program code in a predetermined component in the UE.

Figure 12:
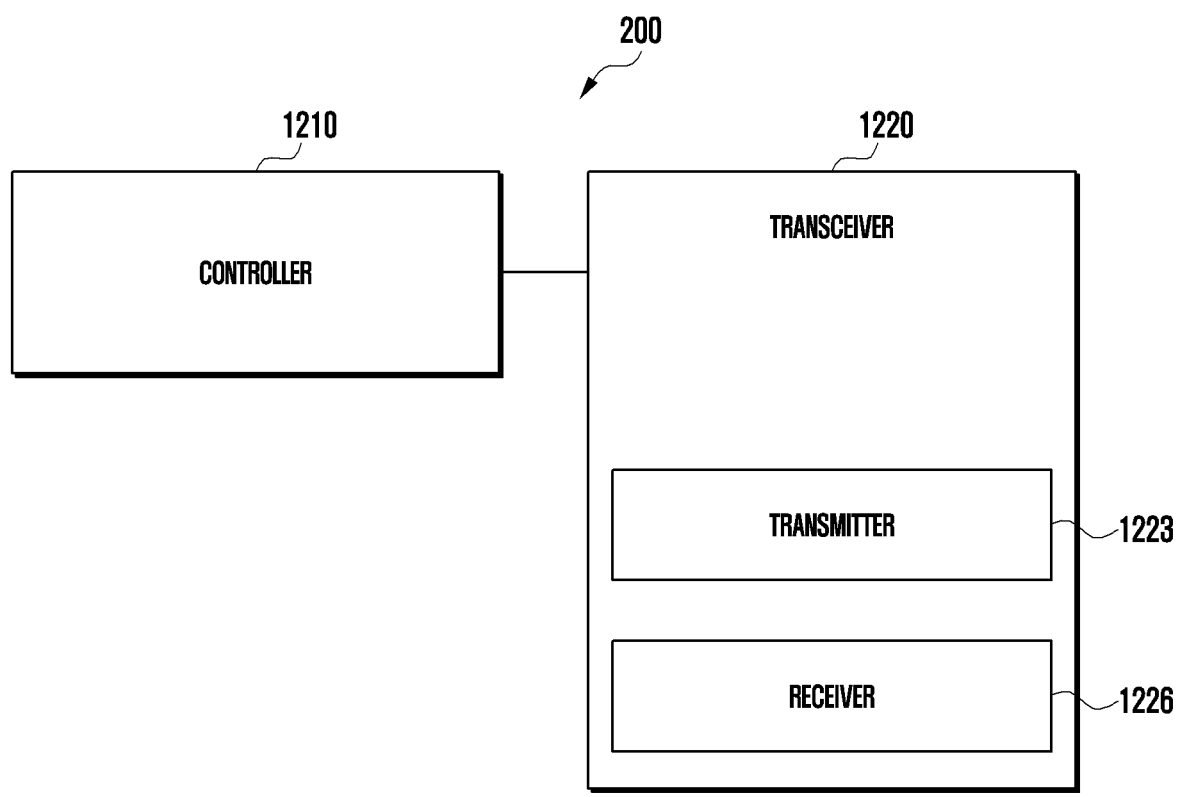
FIG. 12 illustrates a configuration of a network entity according to the disclosure.

FIG. 12 illustrates a configuration of a network entity according to an embodiment of the disclosure.

A network entity according to an embodiment of the disclosure may include a transceiver 1220 and a controller 1210 which controls the overall operations of the network entity. In addition, the transceiver 1220 may include a transmitter 1223 and a receiver 1225.

The transceiver 1220 may transmit or receive a signal with other network entities.

The controller 1210 may control the network entity to perform an operation of one of the above-described embodiments. Meanwhile, the controller 1210 and the transceiver 1220 are not necessarily required to be implemented as separate modules, and the controller and the transceiver may be implemented as one component in the form of a single chip. In addition, the controller 1210 and the transceiver 1220 may be electrically connected to each other. For example, the controller 1210 may be a circuit, an application-specific circuit, or at least one processor. In addition, the operations of the network entity may be implemented by including a memory device storing a corresponding program code in a predetermined component in the network entity.

It should be noted that the configuration illustrated in FIGS. 11 and 12, the example of the control/data signal transmission method, the example of the operation procedure, and the configurations are not intended to limit the scope of right of the disclosure. In other words, all the components, entities, or operational steps illustrated in FIGS. 1A to 5 should not be construed as essential components for implementing the disclosure, and the disclosure may be implemented within a scope with only some of the components without departing from the gist of the disclosure.

The above-described operations of the base station or the UE may be implemented by including a memory device storing a corresponding program code in a predetermined component in the base station or the UE apparatus. In other words, the controller of the base station or the UE apparatus may execute the above-described operations by reading and executing a program code stored in the memory device by a processor or central processing unit (CPU).

Various components, modules, etc. of the UE apparatus, the base station, or the entity described herein may be operated by using a hardware circuit, for example, a complementary metal oxide semiconductor-based logic circuit, firmware, software, and/or a combination of hardware, firmware, and/or software embedded in a machine readable medium. For example, various electric structures and methods may be implemented using electric circuits such as transistors, logic gates, and an application specific integrated circuit.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. A method performed by a terminal in a wireless communication system, the method comprising:
   receiving, from a first base station of a first radio access technology (RAT), system information including information on at least one resource pool for a sidelink communication of a second RAT;
   transmitting, to the first base station of the first RAT, a sidelink user equipment (UE) information message for requesting a sidelink resource of the second RAT;
   receiving, from the first base station of the first RAT, a radio resource control (RRC) reconfiguration message including sidelink resource information indicating one resource pool among the at least one of the resource pool, wherein the one resource pool is scheduled by a second base station of the second RAT based on the sidelink UE information message; and
   performing the sidelink communication of the second RAT with another terminal, based on the sidelink resource information.

2. The method of claim 1, wherein the first RAT is a new radio (NR), and the second RAT is a long term evolution (LTE).

3. A method performed by a first base station using a first radio access technology (RAT) in a wireless communication system, the method comprising:
   transmitting, to a terminal, system information including information on at least one resource pool for a sidelink communication of a second RAT;

receiving, from the terminal, a sidelink user equipment (UE) information message for requesting a sidelink resource of the second RAT;

transmitting, to a second base station of the second RAT, a request message including the sidelink UE information message;

receiving, from the second base station, a response message for the request message including sidelink resource information indicating one resource pool among the at least one resource pool, wherein the one resource pool is scheduled by the second base station of the second RAT based on the sidelink UE information message; and transmitting, to the terminal, a radio resource control (RRC) reconfiguration message including the sidelink resource information, wherein the sidelink communication of the second RAT is performed between the terminal and another terminal based on the sidelink resource information.

4. The method of claim 3, wherein the first RAT is a new radio (NR), and the second RAT is a long term evolution (LTE).

5. A terminal in a wireless communication system, the terminal comprising:

a transceiver; and a controller configured to:

control the transceiver to receive, from a first base station of a first radio access technology (RAT), system information including information on at least one resource pool for a sidelink communication of a second RAT, control the transceiver to transmit, to the first base station of the first RAT, a sidelink user equipment (UE) information message for requesting a sidelink resource of the second RAT;

control the transceiver to receive, from the first base station of the first RAT, a radio resource control (RRC) reconfiguration message including sidelink resource information indicating one resource pool among the at least one resource pool, wherein the one resource pool is scheduled by a second base station of the second RAT based on the sidelink UE information message; and perform the sidelink communication of the second RAT with another terminal, based on the sidelink resource information.

6. The terminal of claim 5, wherein the first RAT is a new radio (NR), and the second RAT is a long term evolution (LTE).

7. A first base station using a first radio access technology (RAT) in a wireless communication system, the first base station comprising:

a transceiver; and a controller configured to:

control the transceiver to transmit, to a terminal, system information including information on at least one of resource pools for a sidelink communication of a second RAT;

receive, from the terminal, a sidelink user equipment (UE) information message for requesting a sidelink resource of the second RAT;

control the transceiver to transmit, to a second base station of the second RAT, a request message including the sidelink UE information message;

control the transceiver to receive, from the second base station, a response message for the request message including sidelink resource information indicating one resource pool among the at least one resource pool, wherein the one resource pool is scheduled by the second base station of the second RAT based on the sidelink UE information message; and control the transceiver to transmit, to the terminal, a radio resource control (RRC) reconfiguration message including the sidelink resource information, wherein the sidelink communication of the second RAT is performed between the terminal and another terminal based on the sidelink resource information.

8. The first base station of claim 7, wherein the first RAT is a new radio (NR), and the second RAT is a long term evolution (LTE).

* * * * *